(12) United States Patent
Mundt et al.

(10) Patent No.: US 6,746,207 B1
(45) Date of Patent: Jun. 8, 2004

(54) TURBOPROP AIRCRAFT ENGINE

(75) Inventors: Christian Mundt, Eichwalde (DE); Dimitrie Negulescu, Berlin (DE); Marco Rose, Freiberg (DE); Rene Spieweg, Berlin (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 10/409,196

(22) Filed: Apr. 9, 2003

(30) Foreign Application Priority Data

Apr. 9, 2002 (DE) .......................... 102 15 551

(51) Int. Cl.[7] ................................ F01D 9/00
(52) U.S. Cl. .................... 415/185; 137/15.1; 60/39.092
(58) Field of Search ................. 415/183, 185, 415/189, 191, 121.2; 137/15.1; 60/39.092, 751

(56) References Cited

U.S. PATENT DOCUMENTS

| 2,994,471 | A | * | 8/1961 | Lewis et al. | 417/381 |
|---|---|---|---|---|---|
| 4,397,431 | A | | 8/1983 | Ben-Porat | |
| 4,527,387 | A | | 7/1985 | Lastrina et al. | |
| 4,607,657 | A | | 8/1986 | Hirschkron | |
| 4,938,021 | A | * | 7/1990 | Jones et al. | 60/263 |
| 4,999,994 | A | | 3/1991 | Rud et al. | |
| 5,150,569 | A | * | 9/1992 | Chapman | 60/787 |

FOREIGN PATENT DOCUMENTS

| DE | 866144 | 2/1953 |
|---|---|---|
| DE | 3341553 | 5/1984 |
| DE | 3611803 | 4/1987 |
| DE | 3828834 | 3/1991 |
| WO | 9810984 | 3/1998 |
| WO | 0183297 | 11/2001 |

OTHER PUBLICATIONS

German Search Report Feb. 27, 2003.

* cited by examiner

Primary Examiner—Ninh H. Nguyen
(74) Attorney, Agent, or Firm—Davidson Berquist Klima & Jackson, LLP

(57) ABSTRACT

A turboprop aircraft engine includes at least one outer air intake 1 and at least one downstream inner duct system 2 for the delivery of air to a compressor, and the inner duct system 2 spirals around the center axis 3 of the engine.

12 Claims, 5 Drawing Sheets

TURBOPROP AIRCRAFT ENGINE

BACKGROUND OF THE INVENTION

This invention relates to a turboprop aircraft engine with an outer air intake and a downstream inner duct system for the delivery of air to a compressor.

The air required by the turboprop aircraft engine is initially routed through at least one outer air intake and subsequently delivered to the compressor via an associated inner duct system.

Such air inlets may consist of only one outer air intake and only one associated duct system or comprise several such air intakes and duct systems. The state of the art shows these air guiding systems as chin intakes or scoop intakes. These can be multi-fluted or branched (e.g. the bifurcated inlet).

Known designs are shown in the U.S. Pat. Nos. 5,725,180 and 4,617,028, for example.

The known designs are geared to delivering the air to the entry of the compressor with maximal uniformity and with minimal swirl. Accordingly, the total pressure loss between the intake lip and the compressor entry should be as low as possible. The efficiency and stability of the compressor are influenced by the total pressure loss, the uniformity of the air supply and the swirl of the airflow.

In the state of the art, the walls of the air guiding system are designed in view of the above situation. The entire system of both the outer air intake and the subsequent inner duct system are designed such that the air is guided in parallel with the center axis of the engine (machine axis). The entry stator of the compressor then deflects the airflow in a direction suitable for the compressor by imparting an appropriate circumferential component to the airflow in the direction of rotation of the compressor.

The state of the art is disadvantageous in that the airflow in front of the outer air intake is deflected by the rotating propeller and is given a swirl. This swirl is eliminated in the state of the art by the design of the outer air intake and the subsequent inner duct system. Depending on the direction of rotation of the compressor and the propeller, this may result in undesired effects which decrease efficiency.

It is further disadvantageous that the interaction of the swirling flow in the axially orientated duct walls of the duct system known from the state of the art promotes the formation of recirculation zones and longitudinal swirls in the flow within the duct system. This will again decrease efficiency, impair the uniformity parameters of the flow at the compressor entry and worsen the total pressure loss.

BRIEF SUMMARY OF THE INVENTION

In a broad aspect, the present invention provides a development of a turboprop aircraft engine of the type specified above in such a manner that the air is delivered to the compressor without loss and the stability of operation of the compressor is supported.

It is a particular object of the present invention to provide solution to the above problem by the features described herein, with further objects and advantages of the present invention becoming apparent from the description below.

The present invention accordingly provides for at least one inner duct system spiraling around the center axis of the engine.

The design according to the present invention is characterized by a variety of merits.

The specific form of the duct system advantageously influences the flow of air from the outer air intake to the compressor.

Compared with the designs known from the state of the art, the present invention reduces the pressure loss in the duct system and makes the flow less uneven. Thus, the performance of the entire air intake system will be enhanced. The flow will generally be guided in an improved manner, resulting in a reduction of local effects, for example local deflections and swirling. This, in turn, will minimize the interaction between the airflow and the fixed walls of the air intake and the inner duct systems as well as the formation of secondary flows (swirls, separation etc.).

Generally, the present invention provides for an increase of efficiency of the intake or a minimization of losses. Thus, the specific fuel consumption of the engine will be improved and the quality of the inflow to the compressor enhanced.

Further, the present invention is highly advantageous if the directions of rotation of the propeller and of the compressor are identical. In this case, the specific form of the design will support the direction of propeller rotation of the airflow. The swirl of the inflowing air will be conserved and optimized accordingly, resulting in an improved inflow to the compressor, in particular its entry area.

The present invention, therefore, provides the opportunity to design the swirl of the airflow from the outer air intake to the compressor in a suitable manner and to optimize it by the form of the duct system, with the swirl being either decreased or increased. With the inflow to the compressor being improved, it is also possible to dispense with the entry guide vane of the compressor. Thus, design of the entire engine can be simplified, resulting in a considerable saving of weight. In addition, total efficiency will be further enhanced as a result of the absence of any pressure loss due to the entry guide vane.

Obviously, the principal idea underlying the present invention is to design the air inlet system in such a manner that the swirl imparted by the propeller is conserved to a large extent. In accordance with the present invention, the inner duct system and, in a preferred development, the outer air intake, are oriented in the direction of the swirling flow. The specific form of the air guiding system according to the present invention (twist angle in dependence of the axial position relative to the center axis of the engine) can, therefore, be optimized according to the angular momentum conservation law of aerodynamics. Thus, a form of the inner duct system as well as of the outer air intake will be obtained which spirals, or corkscrews, around the center axis of the engine. Hence, the design of the respective air ducts and guides follows the form of swirl of the airflow, resulting in a "twisted duct".

BRIEF DESCRIPTION OF THE DRAWINGS

This invention is more fully described in the light of the accompanying drawings showing a preferred embodiment. In the drawings.

DETAILED DESCRIPTION OF THE INVENTION

This detailed description should be read in conjunction with the summary above, which is incorporated by reference in this section.

Figure 3:
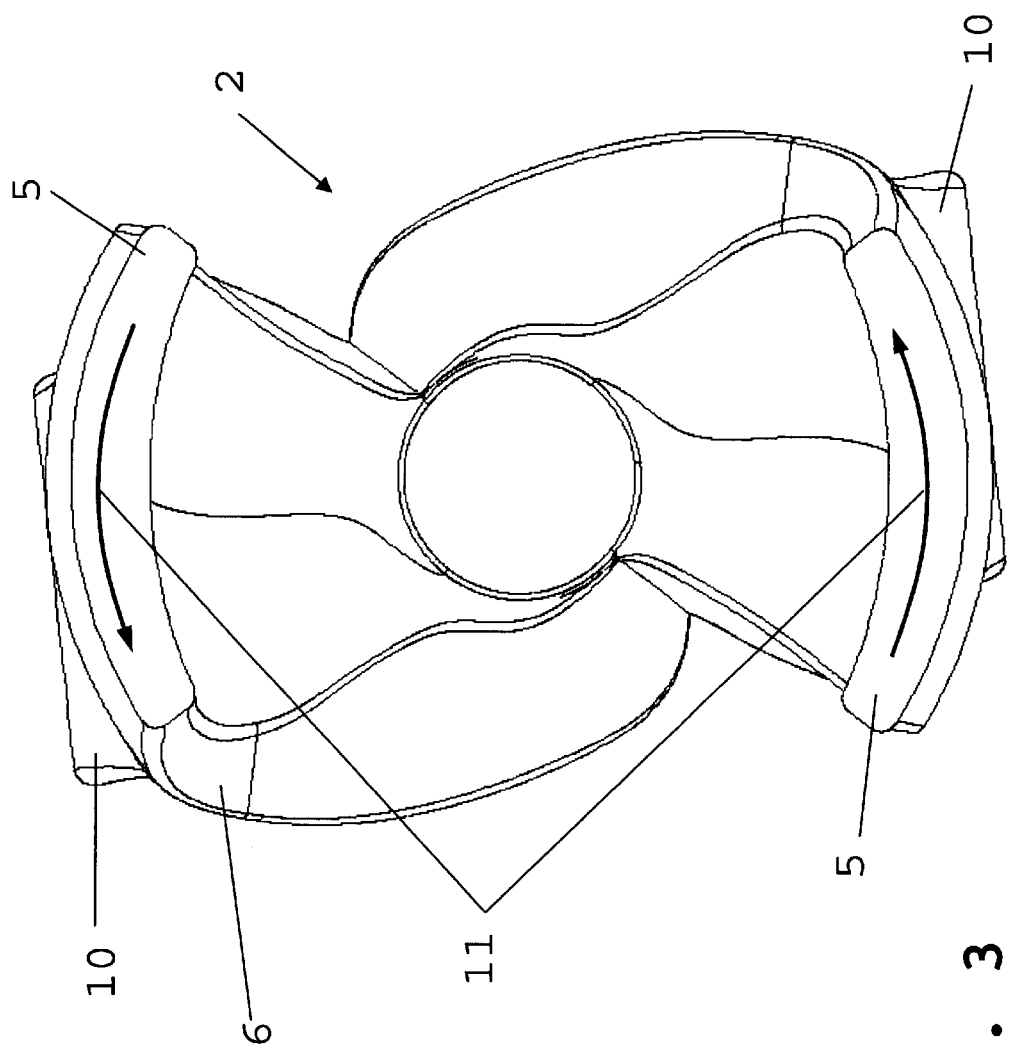
FIG. 3 is a front view of the arrangement shown in FIGS. 1 and 2.
Figure 4:
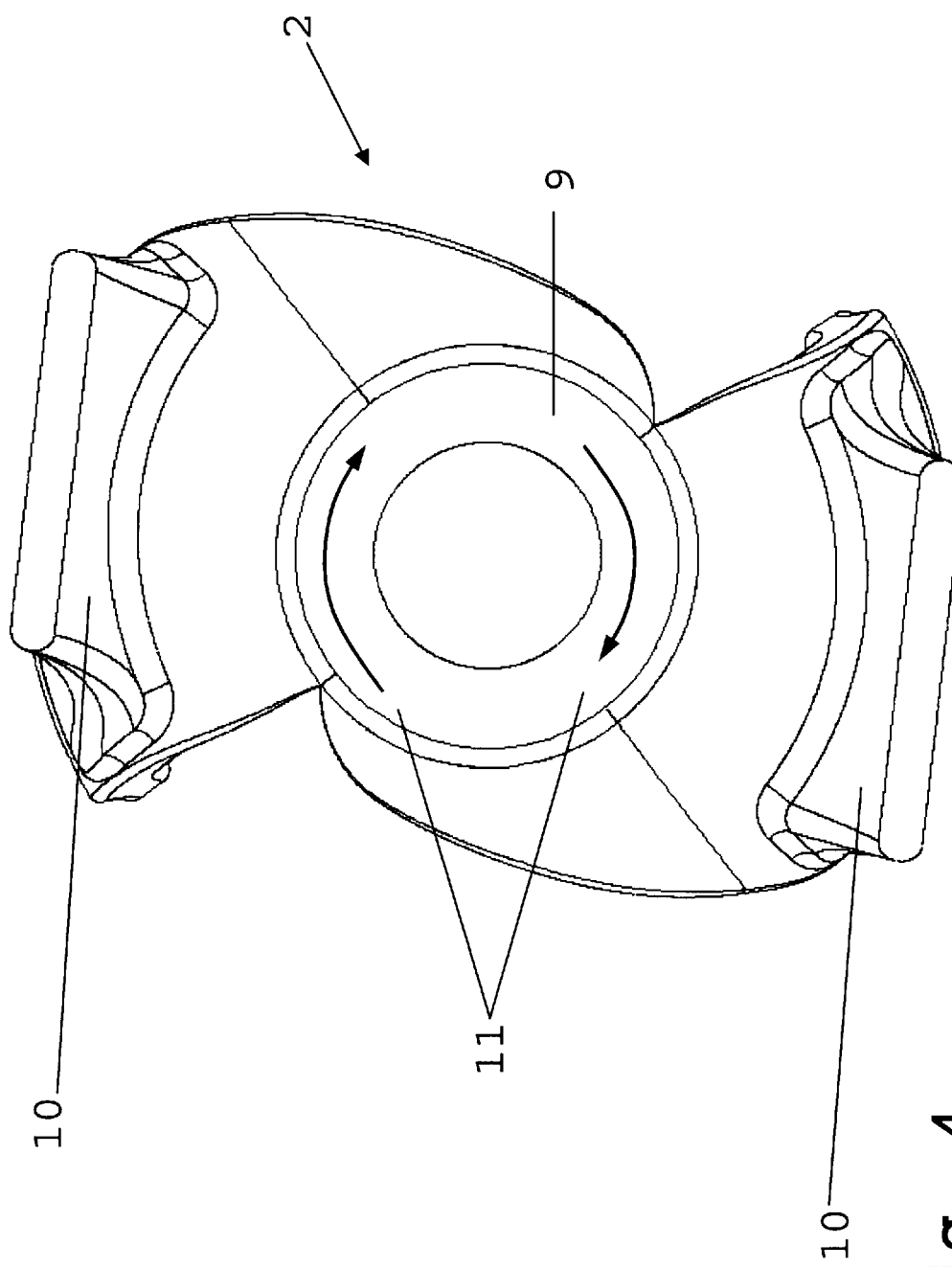
FIG. 4 is a rear view of the embodiment shown in FIGS. 1 to 3.
Figure 5:
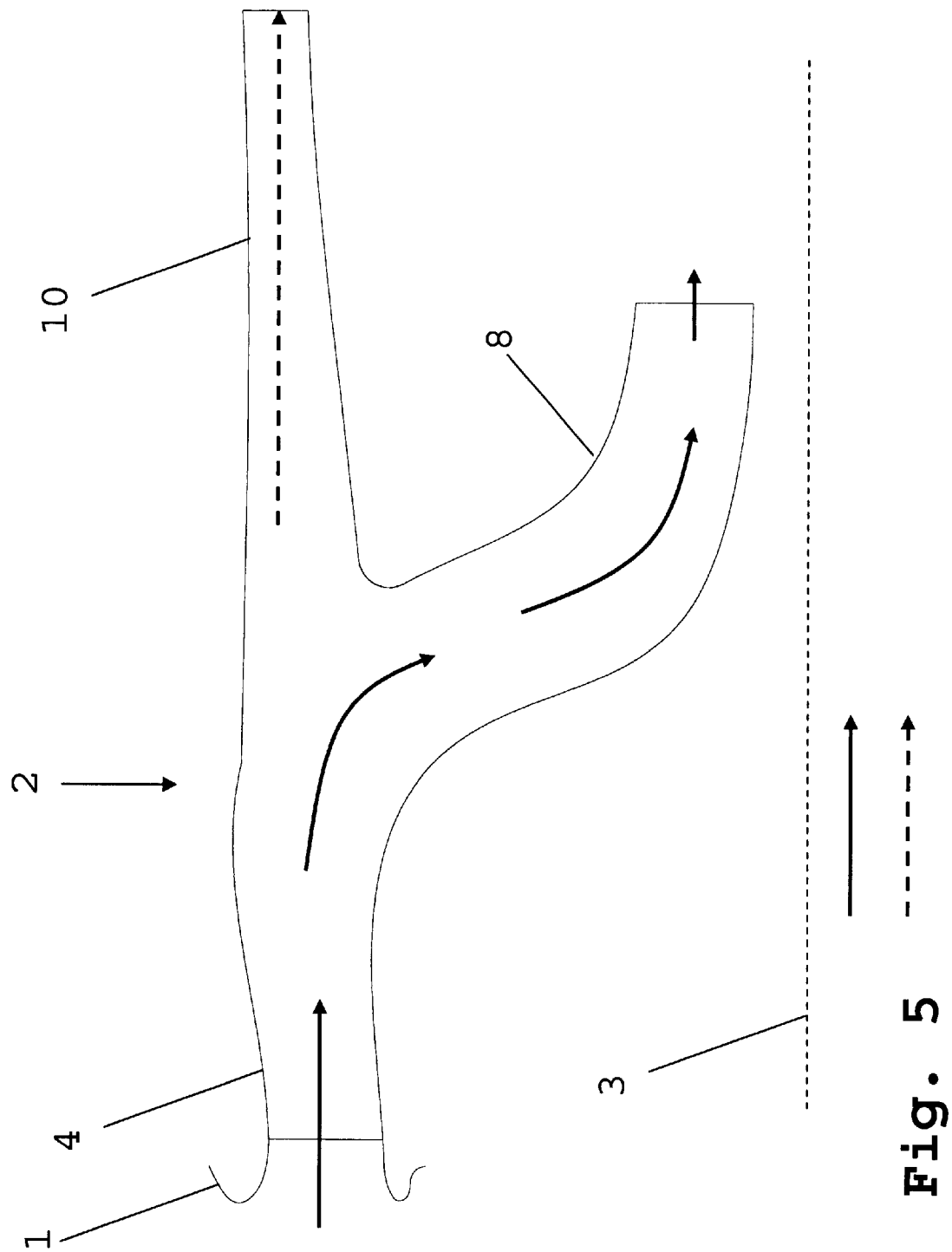
FIG. 5 is a schematic side sectional view of the air guiding system.

FIG. 5 shows an outer air intake 1 which is followed by an inner duct system. FIGS. 1 to 4 start only with the representation of the throat 5 and detail the inner duct system 2. The center axis of the engine is indicated by the reference numeral 3.

In particular, the air intake comprises a throat 5, which transits into a diffuser 6. Downstream of the diffuser 6, a deflector 7 and a confusor 8 are arranged in this sequence, the latter issuing into an annulus 9. Downstream of the annulus 9 is a compressor, which is not illustrated herein.

Furthermore, a particle separator 10 is provided (a device for the removal of particles introduced by the airflow) which is arranged in an extension of the diffuser section (diffuser 6). See FIG. 1 which shows the airflow in bold arrow and the separated particle flow in dashed arrow.

Since the general design of both the outer air intake and the inner duct system is known from the state of the art, a detailed description of the airflow ducting and guiding arrangement has been dispensed with herein.

Figure 1:
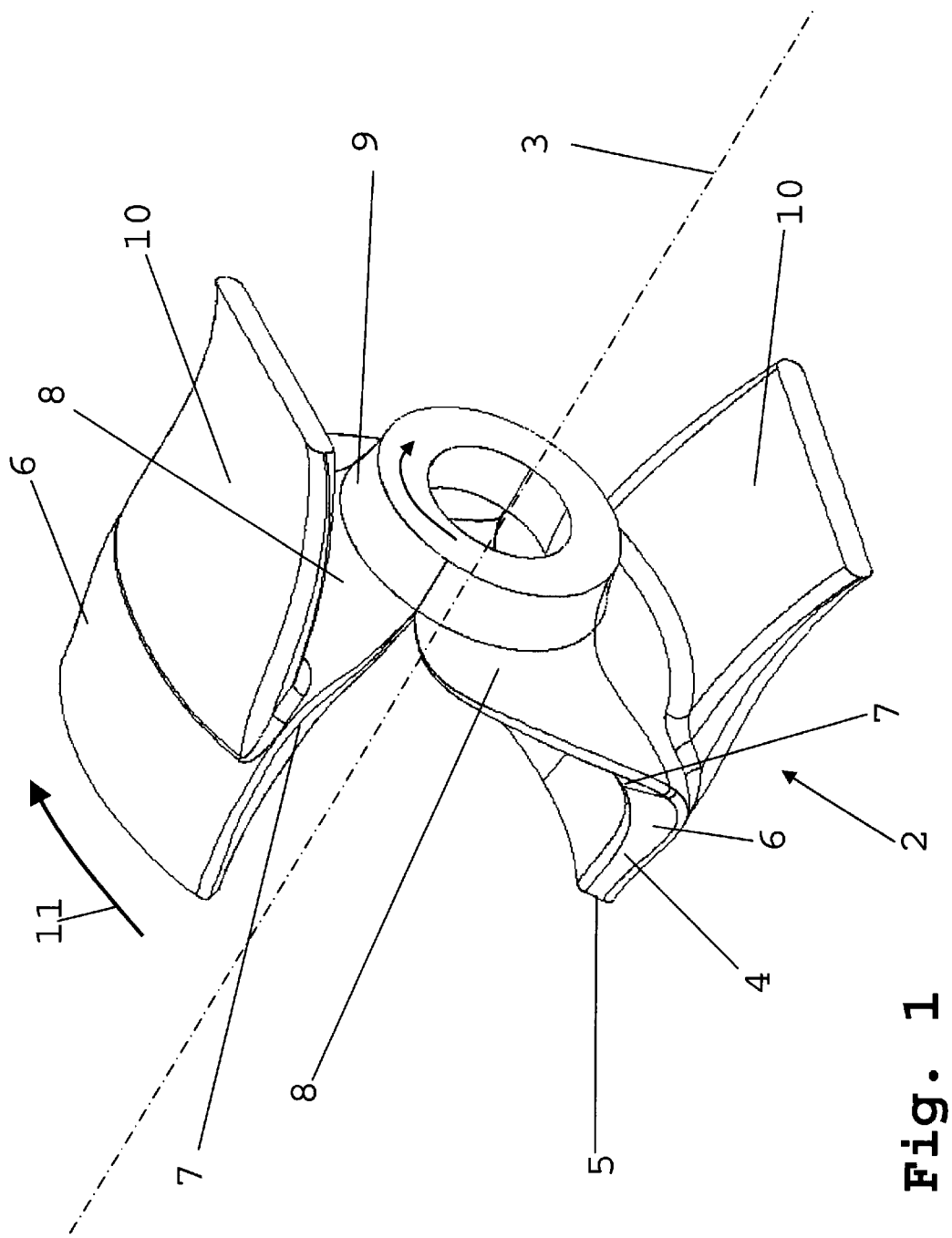
FIG. 1 is a perspective schematic view of the air guiding system according to the present invention with outer air intake and inner duct system.
Figure 2:
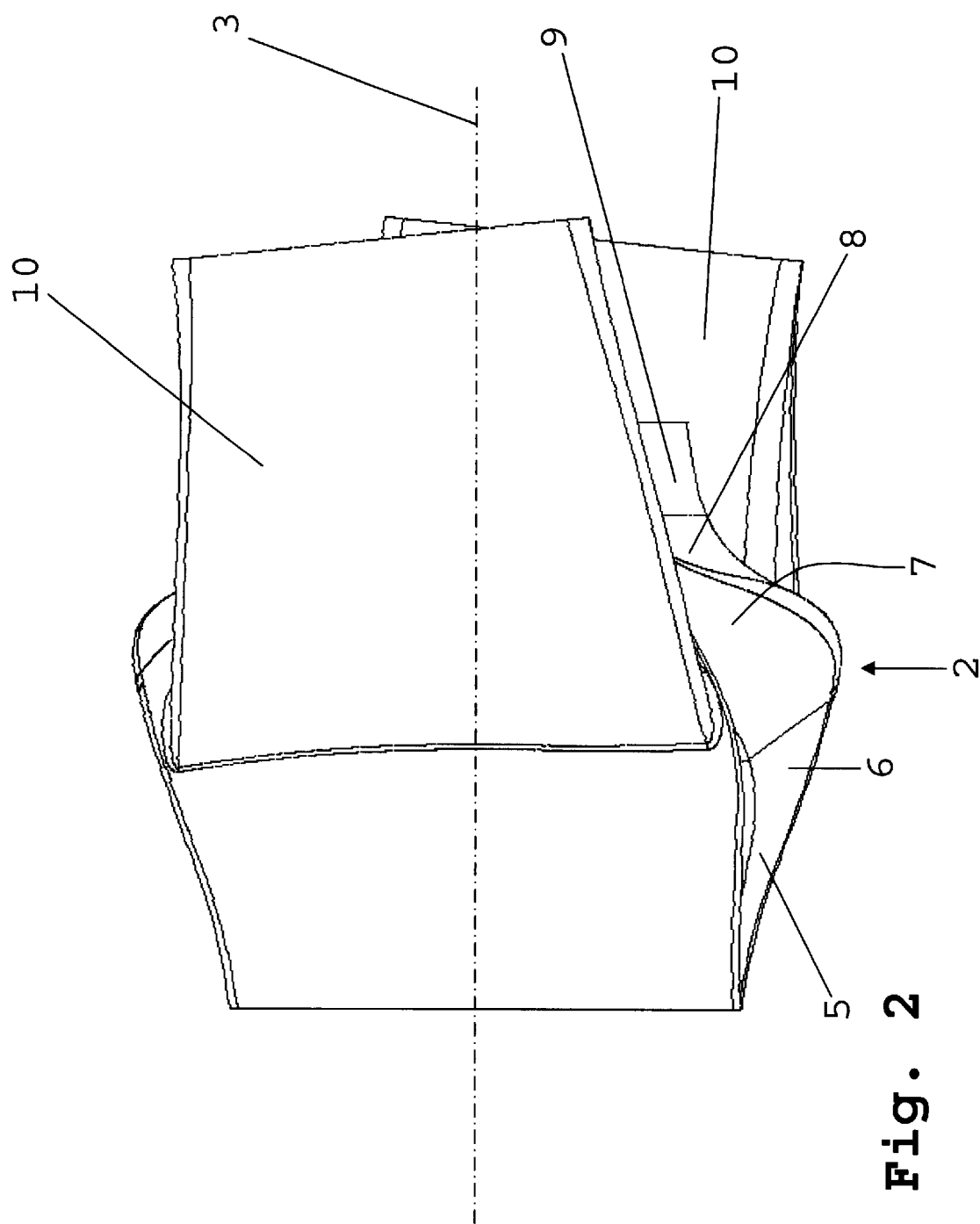
FIG. 2 is a top view of the embodiment shown in FIG. 1.

The present invention provides for the spiral or corkscrew form as already described. FIGS. 1, 3 and 4 show the swirl direction 11 in which the entire arrangement is twisted around the center axis 3, with the components being illustrated in schematic representation. The direction of spiraling of the duct system is set to match the direction of the rotation of the propeller attached to the engine and the degree of spiraling can be set as desired to maximize the benefit resulting therefrom. Thus, in most applications the degree of spiraling of the ducting system will be set to maximize the benefits of the spiraling when the aircraft/engine is operating at normal cruising conditions.

What is claimed is:

1. A turboprop aircraft engine with at least one outer air intake and at least one downstream inner duct system for the delivery of air to a compressor, wherein the inner duct system spirals around a center axis of the engine.

2. A turboprop aircraft engine in accordance with claim 1, wherein a twist angle of the spiral arrangement is determined in dependence of a swirl of airflow imparted by a propeller attached to the engine.

3. A turboprop aircraft engine in accordance with claim 2, wherein the twist angle is set to conserve the swirl of the airflow imparted by the propeller.

4. A turboprop aircraft engine in accordance with claim 3, wherein the twist angle is orientated in a direction of the swirl of the airflow into the outer air intake.

5. A turboprop aircraft engine in accordance with claim 4, wherein the compressor has no entry guide vane.

6. A turboprop aircraft engine in accordance with claim 3, wherein the compressor has no entry guide vane.

7. A turboprop aircraft engine in accordance with claim 3, wherein the twist angle is set to substantially maximize conservation of the swirl of the airflow imparted by the propeller when an aircraft the engine is attached to is operating at normal cruising conditions.

8. A turboprop aircraft engine in accordance with claim 2, wherein the twist angle is orientated in a direction of the swirl of the airflow into the outer air intake.

9. A turboprop aircraft engine in accordance with claim 8, wherein the compressor has no entry guide vane.

10. A turboprop aircraft engine in accordance with claim 2, wherein the compressor has no entry guide vane.

11. A turboprop aircraft engine in accordance with claim 1, wherein the compressor has no entry guide vane.

12. A turboprop aircraft engine in accordance with claim 1, wherein the compressor includes an entry guide vane.

* * * * *